US011516457B2

(12) United States Patent
Gao et al.

(10) Patent No.: US 11,516,457 B2
(45) Date of Patent: Nov. 29, 2022

(54) SWITCHABLE FRINGE PATTERN ILLUMINATOR

(71) Applicant: Meta Platforms Technologies, LLC, Menlo Park, CA (US)

(72) Inventors: Zihe Gao, Redmond, WA (US); Michael Hall, Bellevue, WA (US); Qing Chao, Redmond, WA (US); Zhaoming Zhu, Redmond, WA (US); Tin Komljenovic, Santa Barbara, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/348,469

(22) Filed: Jun. 15, 2021

(65) Prior Publication Data
US 2021/0314549 A1 Oct. 7, 2021

Related U.S. Application Data

(63) Continuation of application No. 16/729,953, filed on Dec. 30, 2019, now Pat. No. 11,070,789.

(51) Int. Cl.
*G01B 11/25* (2006.01)
*H04N 13/254* (2018.01)
(Continued)

(52) U.S. Cl.
CPC ....... *H04N 13/254* (2018.05); *G01B 11/2527* (2013.01); *G01B 11/2536* (2013.01);
(Continued)

(58) Field of Classification Search
CPC .............. H04N 13/254; G01B 11/2527; G01B 11/2536; G02B 27/017; G02B 2027/0138;
(Continued)

(56) References Cited

U.S. PATENT DOCUMENTS 4,798,437 A 1/1989 Rediker et al.
8,922,780 B2 12/2014 Mohazzab et al.
(Continued)

FOREIGN PATENT DOCUMENTS

EP 3445049 A1 2/2019

OTHER PUBLICATIONS

Chu, T. et al., "Compact 1×N thermo-optic switches based on silicon photonic wire waveguides," Opt. Express, Dec. 12, 2005, vol. 13, No. 25, pp. 10109-10114.
(Continued)

*Primary Examiner* — Hesham K Abouzahra
(74) *Attorney, Agent, or Firm* — Fenwick & West LLP

(57) ABSTRACT

A switchable fringe pattern illuminator includes an optical path switch configured to receive light and dynamically control an amount of light that is provided to a first waveguide and an amount of light that is provided to a second waveguide. A first projector configured to generate a first fringe pattern using light from the first waveguide. The first fringe pattern illuminates a first portion of a target area. A second projector configured to generate a second fringe pattern using light from the second waveguide. The second fringe pattern illuminates a second portion of a target area. The illuminator may be part of a depth camera assembly (DCA). The DCA is configured to capture images of a portion of the target area. The DCA is further configured to determine depth information for an object in the target area based in part on the captured images.

20 Claims, 10 Drawing Sheets

(51) Int. Cl.
*G02B 27/01* (2006.01)
*G02F 1/225* (2006.01)

(52) U.S. Cl.
CPC ...... *G02B 27/017* (2013.01); *G02B 2027/014* (2013.01); *G02B 2027/0138* (2013.01); *G02B 2027/0178* (2013.01); *G02F 1/225* (2013.01)

(58) Field of Classification Search
CPC ...... G02B 2027/014; G02B 2027/0178; G02F 1/225
See application file for complete search history.

(56) References Cited

U.S. PATENT DOCUMENTS

| | | | |
|---|---|---|---|
| 10,564,431 B1 | 2/2020 | Chao et al. | |
| 2010/0290060 A1* | 11/2010 | Mohazzab | G01B 11/25 356/492 |
| 2013/0155378 A1* | 6/2013 | Huang | G02B 30/25 353/8 |
| 2016/0134953 A1* | 5/2016 | Kramer | H04Q 11/0067 398/45 |
| 2016/0377417 A1* | 12/2016 | Jovanovski | G01B 11/2536 348/136 |
| 2018/0088454 A1* | 3/2018 | Li | G03B 21/56 |
| 2019/0049237 A1* | 2/2019 | Watanabe | G01B 11/2527 |
| 2020/0382765 A1* | 12/2020 | Gravante | G06T 7/521 |

OTHER PUBLICATIONS

PCT International Search Report and Written Opinion, PCT Application No. PCT/US2020/058498, dated Feb. 3, 2021, 11 pages.
Pintus, P. et al., "Analysis and Design of Microring-Based Switching Elements in a Silicon Photonic Integrated Transponder Aggregator," Journal of Lightwave Technology, Dec. 15, 2013, vol. 31, No. 24, pp. 3943-3955.
International Preliminary Report on Patentability for International Application No. PCT/US2020/058498, dated Jul. 14, 2022, 9 pages.

* cited by examiner

600

Generate instructions for an illuminator and a camera assembly
610

↓

Illuminate a target area in accordance with the instructions
620

↓

Capture images of a portion of the target area in accordance with the instructions
630

↓

Determine depth information based in part on the captured images
640

FIG. 6

SWITCHABLE FRINGE PATTERN ILLUMINATOR

CROSS REFERENCE TO RELATED APPLICATIONS

This application is a continuation of co-pending U.S. application Ser. No. 16/729,953, filed Dec. 30, 2019, which is incorporated by reference in its entirety.

FIELD OF THE INVENTION

This disclosure relates generally to artificial reality systems, and more specifically to switchable fringe pattern illuminators for artificial reality systems.

BACKGROUND

Artificial reality systems can leverage the capture of an environment surrounding a user in three dimensions (3D), as well as tracking a direction of a gaze of the user and other information about the eyes of the user. Fringe pattern illumination is an important aspect of any depth camera sensing since fringe pattern generation decreases aliasing in captured images. Traditional fringe pattern illumination devices for both local area sensing and eye tracking are comparably large in size, heavy, and consume significant amounts of power. Additionally, traditional fringe pattern illumination devices provide limited field of views and a fixed fringe spacing. Thus, prior art illumination devices may not be sufficiently compact or dynamically adjustable.

SUMMARY

A compact light projection system is described for use in artificial reality systems, and which outputs fringe patterned light that may be dynamically adjustable. The light projection system includes one or more switchable fringe pattern illuminators and may be used in a depth camera assembly (e.g., as part of a headset). The switchable fringe pattern illuminators described herein provide flexibility by incorporating dynamically adjustable components, such as phase delay devices, coupling controllers, and switchable light sources, which may each be adjusted to control the resulting fringe pattern of interferometric illumination.

The switchable fringe pattern illuminator includes an optical path switch (e.g. a Mach-Zehnder interferometer (MZI), a multimode interferometer (MMI) based switch, a ring-resonator-based switch, etc.). The optical path switch configured to receive light and dynamically control an amount of light that is provided to a first waveguide and an amount of light that is provided to a second waveguide. A first projector configured to generate a first fringe pattern using light from the first waveguide. The first fringe pattern illuminates a first portion of a target area. A second projector configured to generate a second fringe pattern using light from the second waveguide. The second fringe pattern illuminates a second portion of a target area.

The illuminator may be part of a depth camera assembly (DCA). The DCA is configured generate instructions and provide the instructions to the illuminator. The DCA further comprises a camera assembly configured to capture images of a portion of the target area. The DCA is further configured to determine depth information based in part on the captured images.

BRIEF DESCRIPTION OF THE DRAWINGS

FIG. 6 is a flowchart illustrating a process of illuminating a target area with light emitted by a switchable fringe pattern illuminator, in accordance with one or more embodiments.

Figure 1A:
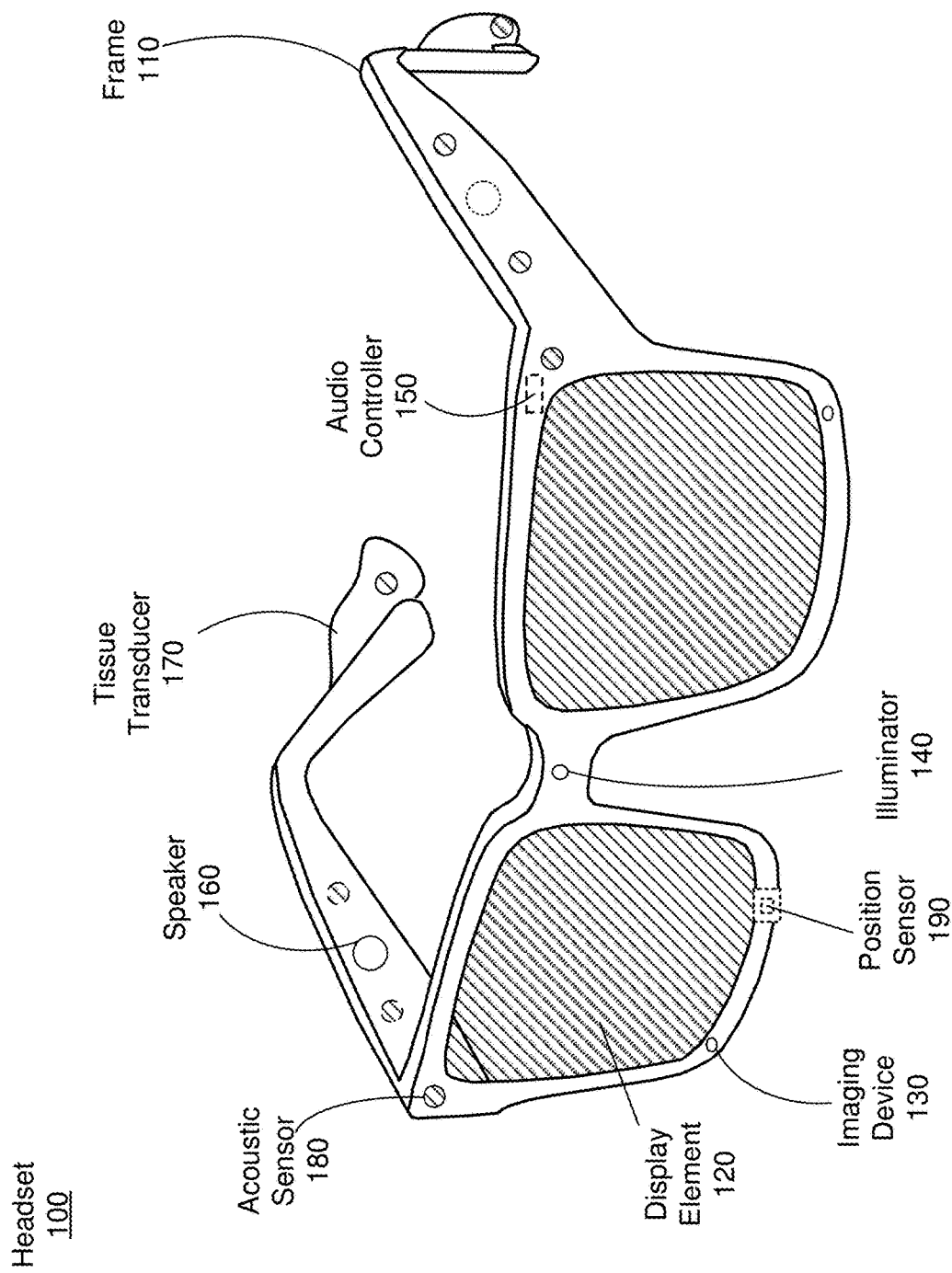
FIG. 1A is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Configuration Overview

A switchable fringe pattern illuminator (hereinafter referred to as illuminator) is a light projection system configured to illuminate a target area with fringe patterned light that may be dynamically adjustable. The illuminator includes at least a light source, at least one optical path switch, and at least two projectors. An optical path switch may be coupled to two projectors. The optical path switch may be a Mach-Zehnder interferometer (MZI), a multimode interferometer (MMI), a ring resonator, some other type of optical path switch, or some combination thereof. In some embodiments, the optical path switch may include a MZI and a MIMI in series. In some embodiments, a device (e.g., a coupling controller or a phase shifter) may be placed in series between the MZI and the MMI. The optical path switch is configured to receive light (e.g., from the light source) and dynamically control an amount of the light that is provided to each of the two projectors. Each projector is configured to generate a fringe pattern that illuminates a portion of a target area. The fringe pattern is a structured light pattern of evenly spaced alternating bright and dark bands of the light illuminating the target area. In one embodiment, the projectors illuminate the same portion of the target area (i.e., the projectors have the same field of view). In another embodiment, the projectors illuminate different portions of the target area (i.e., each projector has a separate field of view). In another embodiment, the projectors illuminate an overlapping portion of the target area (i.e., the field of view of one projector overlaps a portion of the field of view of another projector).

In some embodiments, the illuminator may dynamically adjust a phase of a fringe pattern emitted by a projector (e.g., in accordance with instructions from a controller of a depth camera assembly).

In one embodiment, the at least two projectors include a first projector and a second projector. The first projector is configured to generate a first fringe pattern that has a first fringe spacing and the second projector is configured to generate a second fringe pattern that has a second fringe spacing. Fringe spacing describes how close together peaks (or valleys) of light in a fringe pattern are to each other. In some embodiments, the first fringe spacing is the same as the second fringe spacing. In some embodiments, the first fringe spacing is different from the second fringe spacing.

In some embodiments, the illuminator is part of a depth camera assembly (DCA). The DCA determines depth information about a target area. The DCA includes the illuminator, a camera assembly, and a DCA controller. The camera assembly captures images of the target area that are illuminated by the fringe patterns emitted by the illuminator. The DCA controller determines depth information from the captured images. In some embodiments, the DCA controller may instruct the illuminator to change a phase of one or more of the fringe patterns. In this manner, for a given portion of the target area a series of images may be captured of the same fringe pattern, but at different phase shifts (e.g., 0°, 120°, and 240°). The DCA controller may use the series of images to determine depth information of the portion of the target area.

In some embodiments, the DCA is part of a headset. The headset may be part of an artificial reality system and may further include one or more display elements. The DCA may be used by the headset for eye tracking and/or face tracking.

Conventionally, illumination devices have been challenging to miniaturize to a small form factor desired in artificial reality systems. Additionally, conventional illumination devices may include small field of views and fixed structured light patterns. In contrast, the illuminator may be configured to have a larger field of view by, e.g., tiling fields of view of respective projectors. The increased field of view allows for a greater target area to be sensed by the DCA. Also, the illuminator may emit light with two or more different fringe spacings. Multiple fringe spacings enable de-aliasing in the depth extraction algorithm with less ambiguity. Additionally, a fixed structured light pattern is not ideal for cases where the objects in the target area may have different angular size and/or surface textures. In contrast, in some embodiments, the illuminator is able to dynamically output different fringe patterns that have different fringe spacings. And the selected fringe pattern is based in part on an angular size and/or a surface texture of an object in the target area. Moreover, in contrast to conventional fixed power structured light projectors, in some embodiments, the illuminator can dynamically adjust how much light is emitted by each projector. For instance, an amount of light may be increased for a projector that is illuminating an object with dark reflectivity and/or an object at a greater distance from the illuminator.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

Headset Examples

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece). The face box is a location in space that a face of the user occupies while wearing the headset 100.

The one or more display elements 120 provide light to a user wearing the headset 100. As illustrated the headset includes a display element 120 for each eye of a user. In some embodiments, a display element 120 generates image light that is provided to an eye box of the headset 100. The eye box is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eye box of the headset 100. In-coupling and/or outcoupling of light from the one or more waveguides may be done using one or more diffraction gratings.

In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eye box. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

Note that in some embodiments, the display element 120 may include an additional optics block (not shown). The optics block may include one or more optical elements (e.g., lens, Fresnel lens, etc.) that direct light from the display element 120 to the eye box. The optics block may, e.g., correct for aberrations in some or all of the image content, magnify some or all of the image, or some combination thereof.

The DCA determines depth information for a portion of a local area surrounding the headset 100 (i.e., a target area) and is described in further detail with reference to FIG. 2A. The DCA includes an illumination assembly which may include an illuminator 140, a camera assembly which may include one or more imaging devices 130, and a DCA controller (not shown in FIG. 1A). Some embodiments of the illuminator 140 are described below with regard to FIGS. 3A-4. In some embodiments, the illuminator 140 illuminates a portion of the local area with one or more fringe patterns. Each fringe pattern has a fringe spacing. In some embodiments, the one or more imaging devices 130 of the camera assembly capture images of the target area that include the light from the illuminator 140. As illustrated, FIG. 1A shows a single illuminator 140 and two imaging devices 130 on the frame 110. In some embodiments, the illuminator 140 and the imaging devices 130 may be separated, e.g., the illuminator 140 may be located on one portion of the frame 110 and the imaging devices 130 may be located on a separate position of the frame 110. Distances between the illuminator 140 and the imaging devices 130 form baselines that are used for triangulation calculations and determining a depth of an object. Locating the DCA near the frame 110 may allow for a longer baseline between the illuminator 140 and the imaging devices 130.

The DCA controller computes depth information for the target area using the captured images and one or more depth determination techniques. The depth determination technique may be, e.g., structured light (using one or more fringe patterns), direct time-of-flight (ToF) depth sensing, indirect ToF depth sensing, active stereo analysis (uses texture added to the scene by light from the illuminator 140), some other technique to determine depth information for the target area, or some combination thereof.

Based on the determined depth information, the DCA controller may determine absolute positional information of the headset 100 within the local area. The DCA controller may also generate a model of the local area. The one or more imaging devices 130 may be integrated with the headset 100 or may be positioned within the local area external to the headset 100. In some embodiments, the DCA controller may provide the depth image data to the headset 100, e.g., for further processing and/or communication to some other component of an artificial reality system that includes the headset 100.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIG. 7.

Figure 1B:
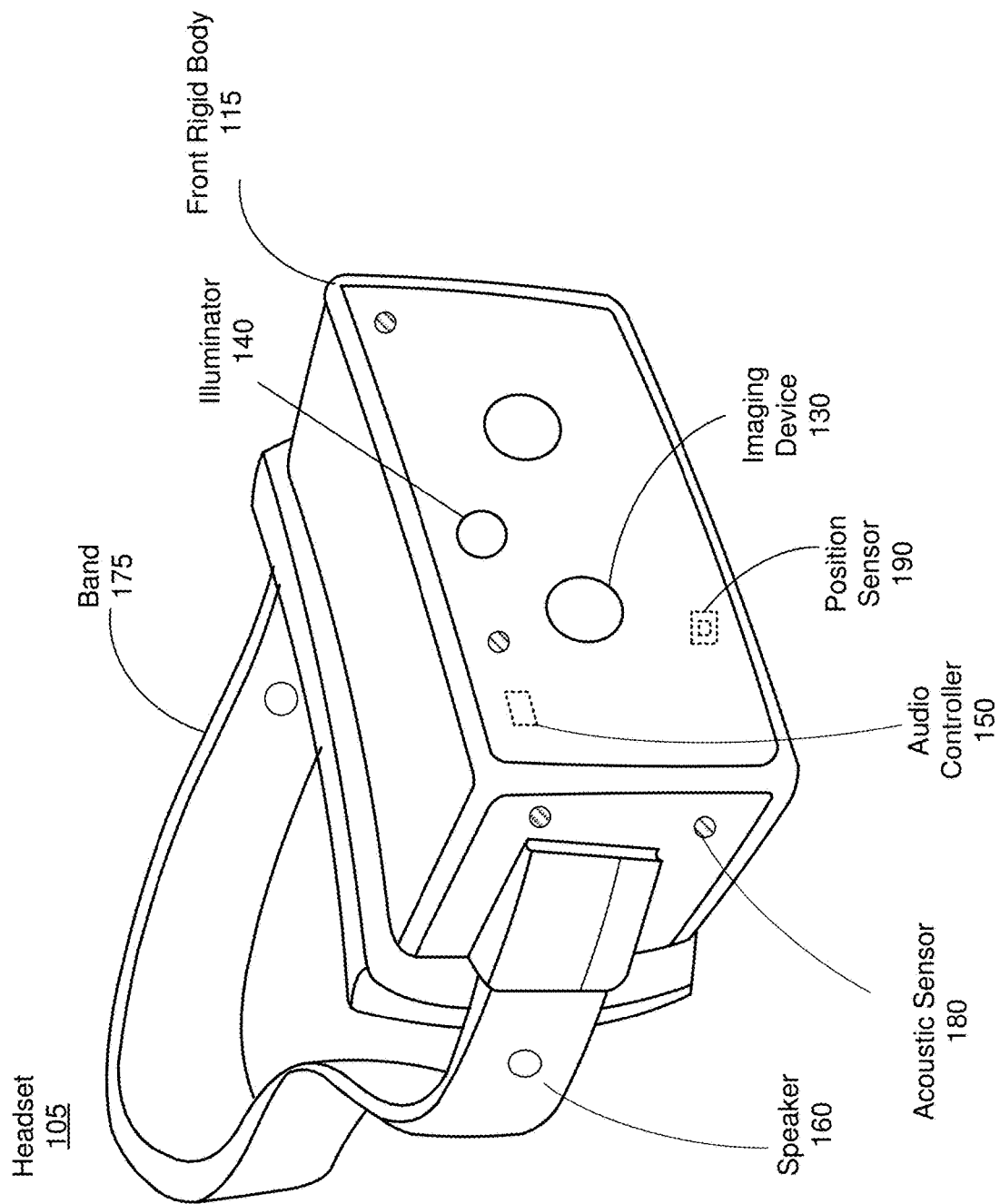
FIG. 1B is a perspective view of a headset implemented as a head-mounted display, in accordance with one or more embodiments.

FIG. 1B is a perspective view of a headset 105 implemented as an HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system, and a position sensor 190. In some embodiments, the DCA is located at a periphery of the headset 105. In some embodiments, the DCA is located at a corner of the headset 105. FIG. 1B shows the illuminator 140, a plurality of the speakers 160, a plurality of the imaging devices 130, a plurality of acoustic sensors 180, and the position sensor 190. The speakers 160 may be located in various locations, such as coupled to the band 175 (as shown), coupled to front rigid body 115, or may be configured to be inserted within the ear canal of a user.

Depth Camera Assembly (DCA) Example

Figure 2A:
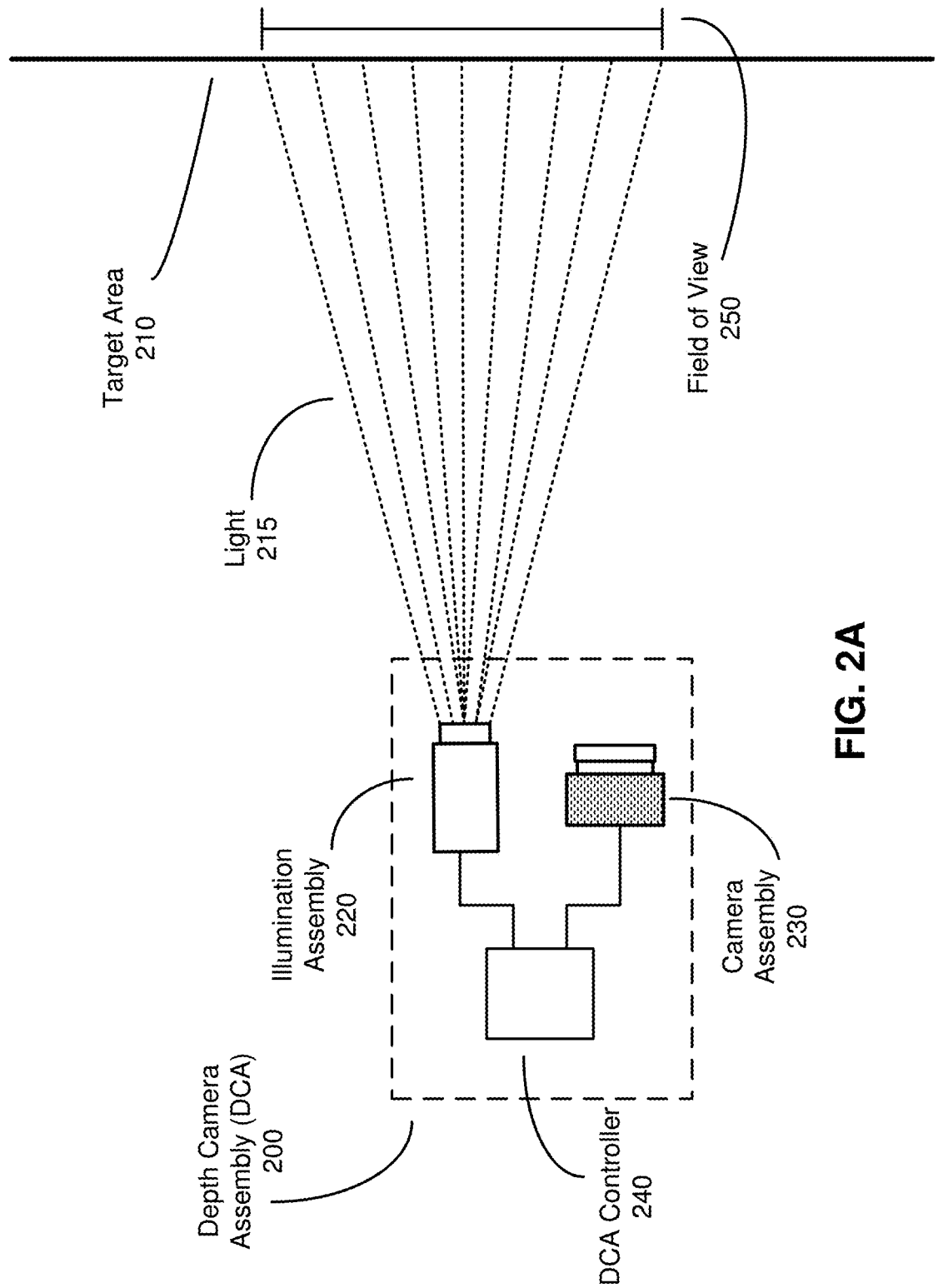
FIG. 2A is a diagram of a depth camera assembly (DCA), in accordance with one or more embodiments.

FIG. 2A is a diagram of a depth camera assembly (DCA) 200, in accordance with one or more embodiments. The DCA 200 may be included on a frame of a headset device (e.g., the headset 100 or the headset 105). As described herein, the DCA 200 may be used to determine depth information for a target area 210. The target area 210 may be, e.g., part of a local area of the headset (e.g., room enclosing a headset) and/or a portion of a face of the user (e.g., eyes, face, etc.). The DCA 200 includes an illumination assembly 220, a camera assembly 230, and a DCA controller 240.

The illumination assembly 220 is configured to illuminate the target area 210 with light 215 in accordance with instructions from the DCA controller 240. The light 215 is composed of one or more fringe patterns. The illumination assembly 220 includes one or more illuminators (e.g., the illuminator 140). The illumination assembly 220 includes at least a light source, at least one optical path switch, and at least two projectors. In some embodiments, the light source emits light of a wavelength in a visible spectrum (~380 nm to 750 nm). In some embodiments, the light source emits light outside of the visible spectrum (e.g., in the near-infrared, infrared, etc.). The light source may be any light source with spatial coherence capable of producing interferometric illumination. The light source provides the light to the optical path switch. The optical path switch controls (e.g., using a coupling controller) an amount of light that is provided to the projectors in accordance with the instructions from the DCA controller 240. The projectors receive the light from the optical path switch and generate a fringe pattern (e.g., with a specific fringe spacing) in accordance with the instructions from the DCA controller 240. In one embodiment, the projectors may apply a phase shift by using a phase delay device that spatially shifts the fringe patterns. In some embodiments, the phase delay device shifts the phase to generate a fringe pattern with a 0° phase shift, the fringe pattern with a 120° phase shift, and the fringe pattern with a 240° phase shift based on the instructions from the DCA controller 240. The illumination assembly 220 is described in further detail with reference to FIGS. 3A-4.

The camera assembly 230 is configured to capture one or more images of at least a portion of the target area 210 (e.g., the field of view 250) in accordance with instructions from the DCA controller 240. The camera assembly 230 includes one or more imaging devices (e.g., the imaging devices 130). The imaging devices may be, e.g., a detector array, camera or video camera, some other device configured to capture light 215 emitted by the illumination assembly 220, or some combination thereof. Additionally or alternatively, the camera assembly 230 captures different fringe patterns produced by the illumination assembly 220 as described in further detail with reference to FIGS. 3A-4. In some embodiments, the camera assembly 230 may include optical filters to filter out wavelengths of light. For example, in embodiments, where the light 215 is in the infrared the optical filter would pass light in the infrared and block light in the visible band.

The DCA controller 240 controls other components (e.g., the illumination assembly 220 and the camera assembly 230) of the DCA 200. In some embodiments, the DCA controller 240 generates instructions for the illumination assembly 220 and/or the camera assembly 230. In some embodiments, the DCA controller 240 may receive instructions for the illumination assembly 220 and/or the camera assembly 230 from a separate component (e.g., a console, a separate controller on a headset, a mobile device, etc.). The DCA controller 240 provides the received instructions to the illumination assembly 220 and/or the camera assembly 230, respectively. The instructions for the illumination assembly 220 cause the illumination assembly 220 to emit one or more fringe patterns (e.g., the light 215) into a same or different portion of the target area 210, control a power of the one or more fringe patterns, control a phase of the one or more fringe patterns, or some combination thereof. The DCA controller 240 generates instructions for the camera assembly 230 to capture images of a portion of the target area 220 that includes the one or more fringe patterns emitted by the illumination assembly 220. The DCA controller 240 determines depth information of objects in the target area 220 based on the captured images. The DCA controllers uses the one or more captured images to determine how the one or more fringe patterns deform while striking surfaces in the target area. The DCA controller 240 determines depth information based on the determined deformation. In some embodiments, the DCA controller 240 provides the determined depth information to a console (not shown in FIG. 2A) and/or an appropriate module of the headset. More details about controlling operation of the illumination assembly 220 and the camera assembly 230 and determining depth information by the DCA controller 240 are disclosed in conjunction with FIG. 6.

The DCA controller 240 may control, based on the instructions, operation of the illumination assembly 220 to dynamically adjust the fringe patterns (e.g., the fringe spacings) of the light 215 illuminating the target area 210, an intensity of the light pattern, the field of view 230 of the light 215 being projected on the target area 220, a phase shift of the light 215, or some combination thereof. In some embodiments, the DCA controller 240 instructs the illumination assembly 320 to shift the phase three times during the illumination of the target area 210. For example, the DCA controller 240 provides three phase shift values (e.g., 0°, 120°, and 240°) to the phase delay device of a projector. In some embodiments, in which the DCA 200 is used for detecting small (i.e., in terms of angular size) 3D objects, e.g. an eye, and/or for detecting objects that contain small surface features of interest, the DCA controller 240 instructs the illumination assembly 220 to emit light with a finer fringe pattern, i.e. small fringe spacings. In other embodiments, in which the DCA 200 is used for detecting large (i.e., in terms of angular size) 3D objects, e.g., a chair, and or for detecting objects that contain few surface features of interest, the DCA controller 240 instructs the illumination assembly 220 to emit light with a coarser fringe pattern, i.e. wide fringe spacings.

The DCA controller 240 may determine initial depth information of objects in the target area 220 by comparing the known fringe pattern output by an illumination assembly 220 to the detected deformed pattern that results from light reflected off of objects in the target area 210. Based on initial depth information, the DCA controller 240 may generate instructions for the illumination assembly 220. For example, to more accurately determine the depth information of the DCA controller 240 may instruct the illumination assembly 220 to emit a specific fringe pattern by adjusting a phase delay device of a projector. The DCA controller 240 may then determine depth information of objects in the target area.

In some embodiments, an object in the target area may include an eye of a user. The DCA controller 240 may estimate a position of the eye using the one or more captured images and a model of the eye. Additionally or alternatively, the DCA controller 240 may determine an eye's gaze angle, a focal distance, vergence and/or accommodation of the eye.

Figure 2B:
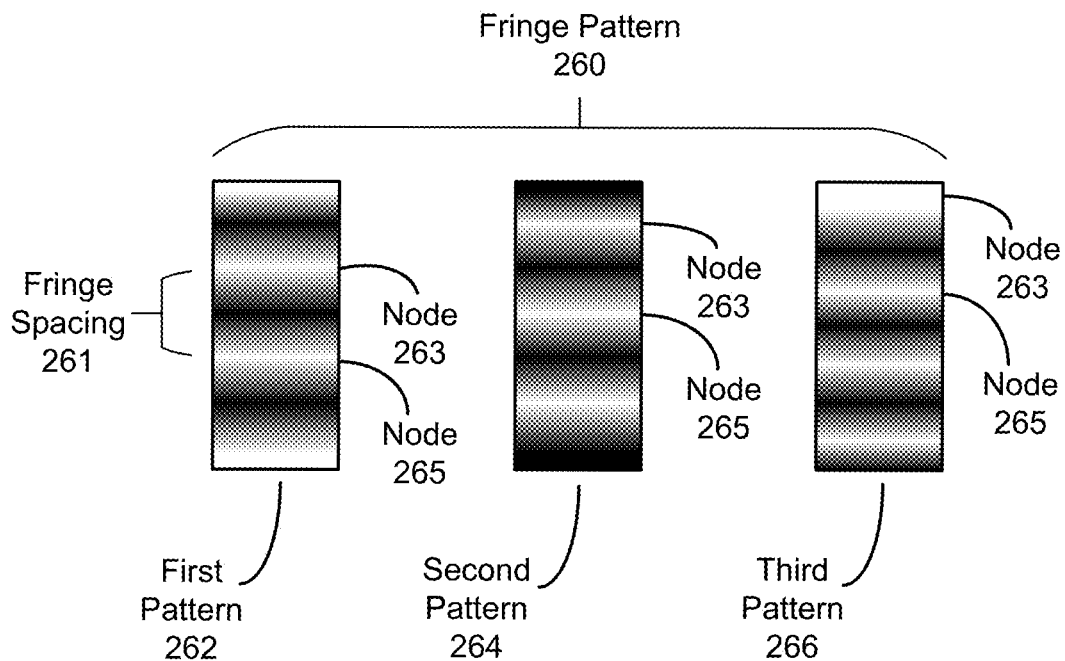
FIG. 2B illustrates examples of fringe pattern outputs with a first spacing, in accordance with one or more embodiments.

FIG. 2B illustrates examples of a fringe pattern 260 with a first fringe spacing 261, in accordance with one or more embodiments. The illumination assembly 220 may be configured to emit the fringe pattern 260. The fringe pattern 260 is produced from a specific phase shift applied by the illumination assembly 220 per the instructions from the DCA controller 240. In FIG. 2B, a phase delay device of the illumination assembly 220 is set to three different values to obtain three different phase shifts of the fringe pattern 260, i.e., a first pattern 262, a second pattern 264, and a third pattern 266. Changing the phase shift of the fringe pattern 260 causes a corresponding lateral shift of peaks (and valleys) in the fringe pattern. For example, as seen in FIG. 2B, positions of a node 263 and a node 265 shift between the first pattern 262, the second pattern 264, and the third pattern 266 and the spacing between the node 263 and the node 265 remains the same (i.e., fringe spacing 261).

In some embodiments, a phase delay device may modulate across a range of applied phase shifts, so that the fringe patterns scan across the surface of objects in the target area (e.g., a portion of the local area and/or an eye). The scan may be in discrete phase shift steps, may be continuous over a range of potential phase shifts, or some combination thereof.

Figure 2C:
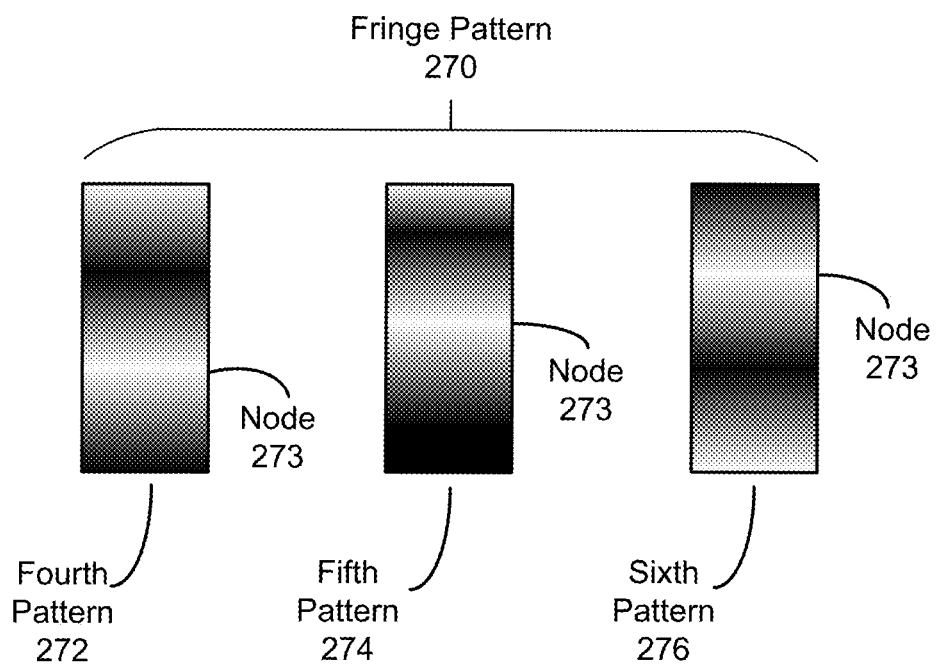
FIG. 2C illustrates examples of fringe pattern outputs with a spacing wider than that shown in FIG. 2B.

FIG. 2C illustrates examples of a fringe pattern 270 with a spacing wider than that shown in 2B. Similarly, to the fringe pattern 260 described in further detail with reference to FIG. 2B, the fringe pattern 270 is produced by the illumination assembly 220 per the instructions from the DCA controller 240. In FIG. 2C, a phase delay device of the illumination assembly 220 is set to three different values to obtain three different phase shifts of the fringe pattern 270, i.e., a fourth pattern 272, a fifth pattern 274, and a sixth pattern 276. The lateral shift of peaks (and valleys) in the fringe pattern can be seen in FIG. 2C. The position of a node 273 shifts between the fourth pattern 272, the fifth pattern 274, and the sixth pattern 276 and the spacing between the node 273 and an adjacent node remains the same.

Switchable Fringe Pattern Illuminator Examples

Figure 3A:
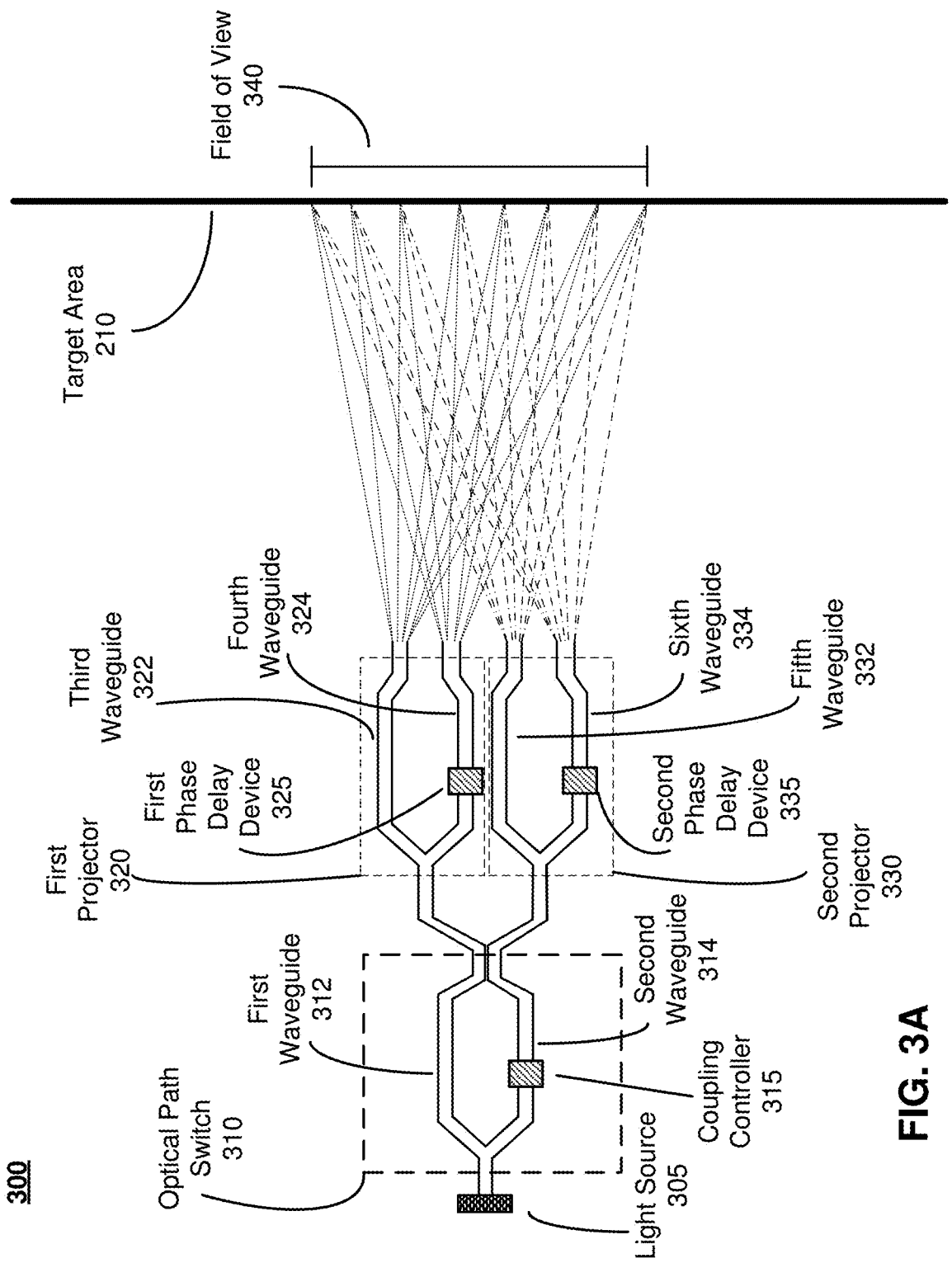
FIG. 3A is a diagram of a switchable fringe pattern illuminator with one field of view, in accordance with one or more embodiments.

FIG. 3A is a diagram of a switchable fringe pattern illuminator 300 (hereinafter referred to as illuminator 300) with one field of view 340, in accordance with one or more embodiments. The illuminator 300 is an embodiment of the illumination assembly 220 in FIG. 2A. The illuminator 300 produces one or more fringe patterns that illuminates a portion of the target area 210. The one or more fringe patterns may be used for eye tracking, face tracking, and/or local area depth sensing. The output of the illuminator 300 is determined by a controller (e.g., the DCA controller 240) which provides instructions to the illuminator 300 to dynamically adjust components, such as phase delay devices, coupling controllers, and switchable light sources, which may each be adjusted to control the resulting fringe pattern of the interferometric illumination. The illuminator 300 includes at least a light source 305, an optical path switch 310, and a first projector 320, and a second projector 330.

In one embodiment, the illuminator 300 may be a chip-scale integrated optical device. In some embodiments, the optical path switch 310, the first projector 320, and the second projector 330 may be located on a single substrate. The substrate may be formed from any standard chip substrate material, such as a semiconductor material, silicon, silicon-on-insulator, gallium arsenide, aluminum gallium arsenide, silicon on sapphire, etc. The substrate may also be formed from any transparent materials in the visible spectrum band (400 nm to 700 nm), such as glass, plastic, polymer, PMMA, silica, and any forms of crystals (such as lithium niobate, tellurium dioxide, etc.). A surface of the substrate may be bonded to a headset. The optical path switch 310, the first projector 320, and the second projector 330 may be bonded to the substrate through any standard bonding technique. Alternatively, any of the optical path switch 310, the first projector 320, and the second projector 330 may be formed on the substrate through any standard etching or epitaxial growth technique.

The light source 305 produces light that is converted to fringe patterned light. The light source 305 may be any light source with spatial coherence capable of producing interferometric illumination, such as a Vertical External-cavity Surface-emitting Laser (VECSEL), a Vertical-cavity Surface-emitting Laser (VCSEL), a superluminescent diode (SLED), a tunable laser, a quantum dot laser, an edge emitting laser, a laser diode, or any combination of these light sources. The light source 305, and any of the light sources described herein, may emit light of a wavelength outside of a visible spectrum (~380 nm to 750 nm). For example, the light source 305 may emit light in the infrared (IR) band (~750 nm to 1700 nm). This may enable an imaging device to distinguish light associated with an eye tracking system and/or the DCA from light associated with visual content of an artificial reality environment, which is in the visible light spectrum. The light source 305 may be controlled by a controller (not shown), processor, or any other central control system associated with a headset. The processor and/or controller is described in further detail with reference to FIG. 7. The power source for the light source 305 may be a power source located on the headset. The light source 305 outputs light to the optical path switch 310.

The optical path switch 310 is configured to control an amount of light provided to the first projector 320 and the second projector 330, in accordance with the controller instructions. The optical path switch 310 includes a first waveguide 312, a second waveguide 314, and a coupling controller 315. The optical path switch 310 is used as an optical switch and the first waveguide 312 and the second waveguide 314 act as conduits for light. The coupling controller 315 controls the amount of light provided to each conduit based on the instructions from the controller. In one embodiment, the optical path switch 310 may provide all of the light to the first waveguide 312. In some embodiments, due to loss of light caused by absorption, reflections, etc., the optical path switch 310 may provide substantially all of the light to the first waveguide 312. In both embodiments, the first waveguide 312 outputs light to the first projector 320.

In some embodiments, the optical path switch 310 provides a greater amount of light to the first waveguide 312 than the second waveguide 314. In this embodiment, the first waveguide 312 outputs a greater amount of light to the first projector 320 than the second waveguide 314 outputs to the second projector 330.

In some embodiments, the optical path switch 310 alternates providing light to the first waveguide 312 and the second waveguide 314. In this embodiment, the first projector 320 and the second projector 330 alternate emitting light.

The first projector 320 is configured to generate light with a fringe pattern in accordance with the instructions from the controller. The first projector 320 includes a third waveguide 322, a fourth waveguide 324, and the first phase delay device 325. The first projector 320 receives light from the optical path switch 310 and is considered active. The light received from the optical path switch 310 is split between the third waveguide 322 and the fourth waveguide 324. The first projector 320 outputs light with a first fringe pattern that illuminates a first portion of the target area 210. In one embodiment, the first projector 320 may apply a phase shift by using a first phase delay device 325 that spatially shifts the fringe patterns.

The second projector 330 is configured to generate light with a fringe pattern in accordance with the instructions from the controller. The second projector 330 includes a fifth waveguide 332, a sixth waveguide 334, and the second phase delay device 335. The entrance of the fifth waveguide 332 is coupled to the entrance of the sixth waveguide 334. The second projector 330 receives light from the optical path switch 310 and is considered active. The light received from the optical path switch 310 is split between the fifth waveguide 332 and the sixth waveguide 334. The second projector 330 outputs light with a second fringe pattern that illuminates a second portion of the target area 210. In one embodiment, the second projector 330 may apply a phase shift by using a second phase delay device 335 that spatially shifts the fringe patterns.

The first projector 320 may receive instructions from the controller managing the amount of phase shift applied by the first phase delay device 325. The first phase delay device 325 may modulate the phase of the light propagating in the fourth waveguide 324 resulting in a phase shift relative to the light propagating in the third waveguide 322. Based on the instructions from the controller, the amount of phase shift applied may be dynamically adjusted by the first phase delay device 325. As the light propagating in the fourth waveguide 324 is phase shifted, the light output by the third waveguide 322 and the fourth waveguide 324 periodically constructively and destructively interfere, producing the first fringe pattern of the interferometric light that illuminates the first portion of the target area (i.e., the field of view 340).

The second projector 330 operates substantially the same as the first projector 320. The light output by the fifth waveguide 332 and the sixth waveguide 334 periodically constructively and destructively interfere, producing a second fringe pattern of the interferometric light that illuminates the second portion of the target area (i.e., the field of view 340). In one embodiment, the second fringe pattern may be that same as the first fringe pattern. For example, the first projector 320 and the second projector 330 emit light with the same fringe spacing and the first phase delay device 325 and the second phase delay device 335 apply the same phase shift. In some embodiments, the second fringe pattern may be different from the first fringe pattern. For example, the first projector 320 and the second projector 330 emit light with different fringe spacing and/or the first phase delay device 325 and the second phase delay device 335 apply a different phase shift.

In some embodiments (not shown), the illuminator may include a lens system. Light from the first projector 320 and/or second projector 330 may pass through the lens system prior to illuminating the target area 210. The lens system is configured to increase or decrease the field of view 340. The lens system may include one or more lenses in series.

More information regarding the operation of the projectors can be found in U.S. patent application Ser. No. 16/028,197 herein in its entirety.

Figure 3B:
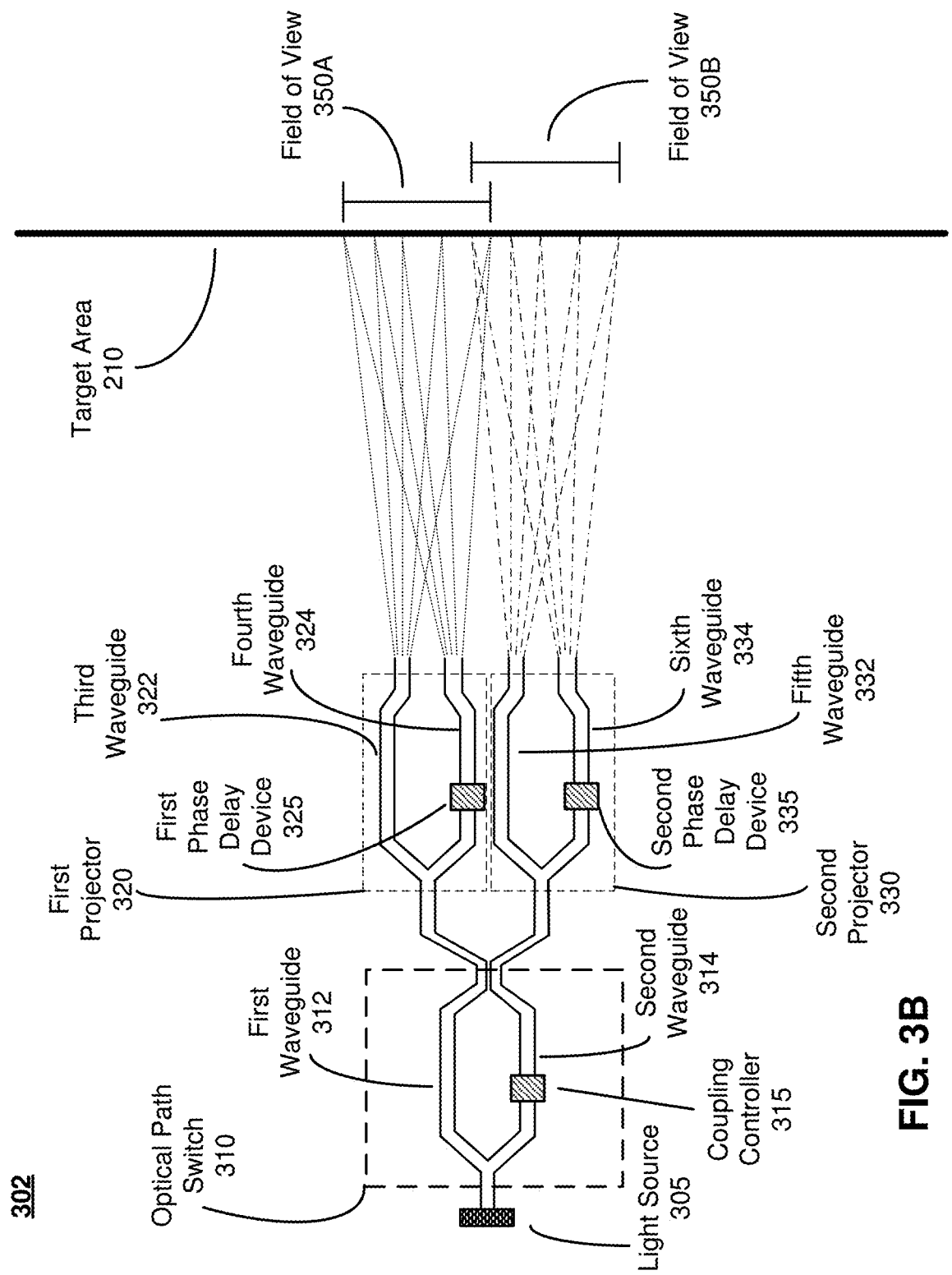
FIG. 3B is a diagram of a switchable fringe pattern illuminator with a tiled field of view, in accordance with one or more embodiments.

FIG. 3B is a diagram of a switchable fringe pattern illuminator with two field of views, in accordance with one or more embodiments. The illuminator 302 is an embodiment of the illumination assembly 220 in FIG. 2A. The illuminator 302 produces fringe patterned light that illuminates a portion of the target area 210. The fringe patterned light may be used for eye tracking, face tracking, and/or local area depth sensing. The output of the illuminator 302 is determined by a controller (e.g., the DCA controller 240) which provides instructions to the illuminator 302 to dynamically adjust components, such as phase delay devices, coupling controllers, and switchable light sources, which may each be adjusted to control the resulting fringe pattern of interferometric illumination. The illuminator 302 is substantially the same as the illuminator 300 except the field of view (i.e., the field of view 350A and the field of view 350B) for the illuminator 302 is tiled.

The first projector 320 of the illuminator 302 outputs light with a first fringe pattern that illuminates a first portion of the target area 210. The first portion is the field of view 350A. The second projector 330 of the illuminator 302 outputs light with a second fringe pattern that illuminates a second portion of the target area 210. The second portion is the field of view 350B. In one embodiment, the field of view 350A and/or the field of view 350B may include an eye box for eye tracking, a face box for face tracking, or some portion of the local area for local area depth sensing.

In one embodiment, as illustrated in FIG. 3B, the field of view 350A and the field of view 350B may be adjacent to and may slightly overlap. The fringe patterns are considered tiled and the overall field of view (i.e., 350A and 350B) of the illuminator 302 is greater than either the field of view 350A or the field of view 350B. For example, the field of view 350A includes an eye box and the field of view 350B includes a face box.

In some embodiments, the field of view 350A and the field of view 350B may be adjacent to and may not overlap each other (not shown). The fringe patterns would still be considered tiled and the overall field of view (i.e., 350A and 350B) of the illuminator 302 is greater than either the field of view 350A or the field of view 350B. For example, the field of view 350A includes an eye box for the right eye of the user and the field of view 350B includes an eye box for the left eye of the user.

In some embodiment, the field of view 350A and the field of view 350B may not be adjacent to and may not overlap each other (not shown). The fringe patterns would not be considered tiled. For example, the field of view 350A includes an eye box and the field of view 350B includes a portion of the local area. Where the field of view 350A and the field of view 350B overlap, the emitted light of the first projector 320 and the second projector 330 may interfere.

Cascaded Switchable Fringe Pattern Illuminator Example

Figure 4:
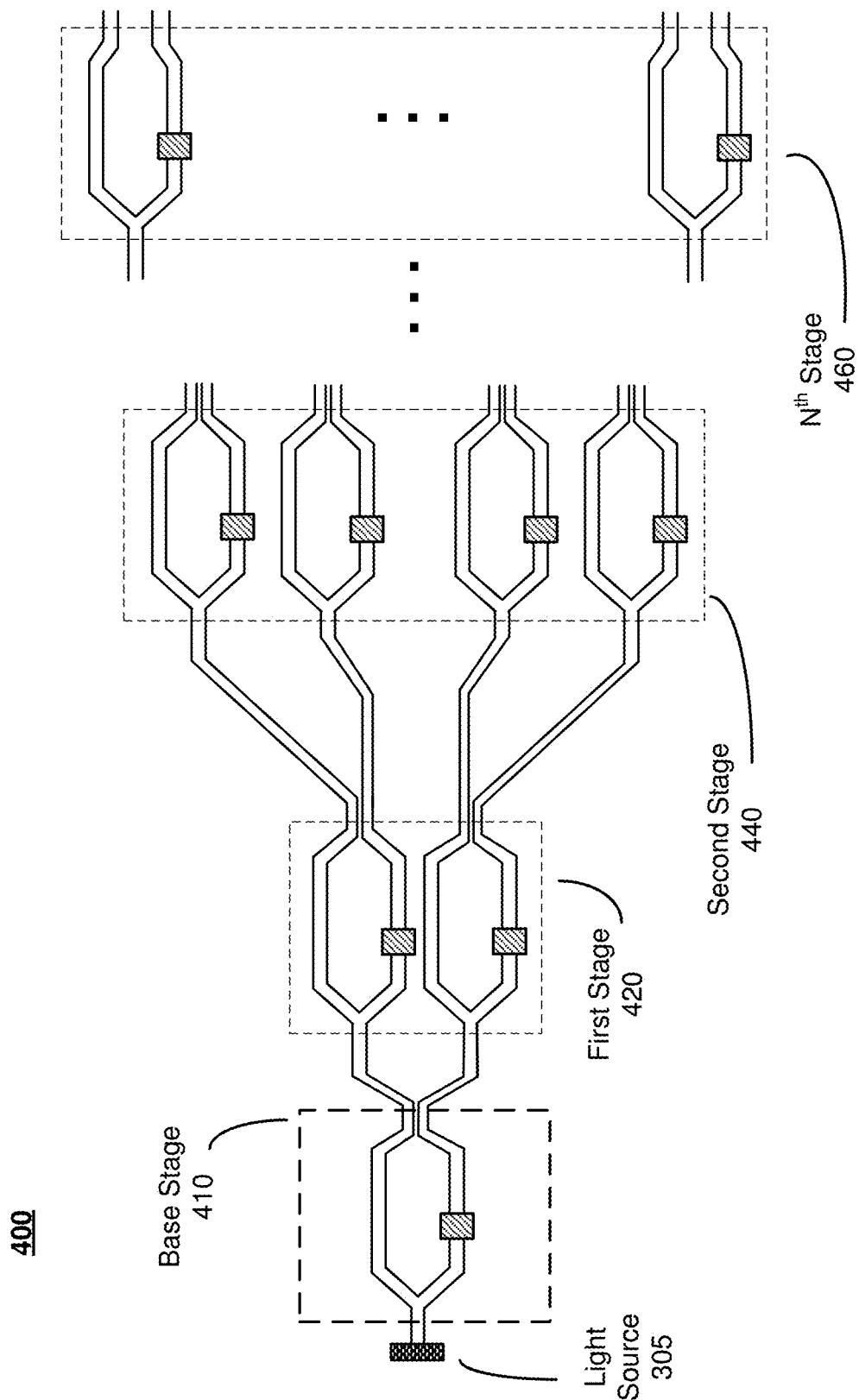
FIG. 4 is a diagram of a cascaded switchable fringe pattern illuminator, in accordance with one or more embodiments.

FIG. 4 is a diagram of a cascaded switchable fringe pattern illuminator 400 (hereinafter referred to as cascaded illuminator 400), in accordance with one or more embodiments. The cascaded illuminator 400 is an embodiment of the illumination assembly 220 in FIG. 2A. The cascaded illuminator 400 is substantially similar to one or both of the illuminator 300 and the illuminator 302 except that the cascaded illuminator 400 includes a plurality of stages between the light source 305 and at least three projectors. The cascaded illuminator 400, illustrated in FIG. 4, includes a base stage 410 and a plurality of additional stages. Each stage includes one or more devices. The one or more devices consist of either optical path switches (e.g., the optical path switch 310) or projectors (e.g., the first projector 320 and the second projector 330). The projectors may be positioned such that the cascaded illuminator 400 has a larger field of view than one or both of the illuminator 300 and the illuminator 302.

In FIG. 4, as illustrated, the cascaded illuminator 400 includes a light source 305, a base stage 410, a first stage 420, a second stage 440, and so forth culminating in an $N^{th}$ stage 460 (where N is an integer). The base stage 410 includes one optical path switch, the first stage 420 includes two optical path switches, the second stage 440 includes four optical path switches, and so on, such that the $N^{th}$ stage 460 includes at most $2^N$ projectors. The light source 305 of the cascaded illuminator 400 outputs light to the base stage 410. The base stage 410 is configured to control the amount of light provided to the devices of the first stage 420, in accordance with the controller instructions. The first stage 420 receives light from the base stage 410 and is configured to control the amount of light provided to the devices of the second stage 440, in accordance with the controller instructions. In one embodiment, one optical path switch in the first stage 420 receives light from the base stage 410 and provides light to the second stage 440. In some embodiments, both optical path switches in the first stage 420 receive light from the base stage 410 and provide light to the second stage 440. The second stage 440 receives light from the first stage 420 and is configured to control the amount of light provided to the devices of the next stage, in accordance with the controller instructions. In one embodiment, two optical path switches in the second stage 440 receive light from the first stage 420 and provide light to the next stage. In some embodiments, all optical path switches in the second stage 440 receive light from the first stage 420 and provide light to the next stage. As the number of stages increase, the number of potential projectors in the final stage increases.

The $N^{th}$ stage 460 of the cascaded illuminator 400 receives light from a N−1 stage. The $N^{th}$ stage 460 is configured to generate light with a fringe pattern and project the light onto a target area, in accordance with the instructions from the controller. At most $2^N$ of the projectors in the $N^{th}$ stage 460 may receive light from the N−1 stage depending on the instructions of the controller. In some embodiments, one or more projectors may be included in earlier stages and less than $2^N$ projectors in the Nth stage 460 may receive light from the N−1 stage.

In an alternate embodiment (not shown), at least one of the devices in one or more of the stages is a projector. For example, the first stage 420 may include a single projector and a single optical path switch. In this embodiment, the optical path switch controls the amount of light provided to a second stage and the projector is configured to generate light with a fringe pattern and project the light onto a target area, in accordance with the controller instructions. Note in this instance, as the first stage includes a single optical path switch, the second stage would have at most three projectors.

The portion of the target area illuminated by the cascaded illuminator 400 (i.e., the field of view) increases with the addition of each stage of devices. In one example, the optical path switch of the base stage 410 dynamically controls an amount of light provided to an optical path switch in the first stage 420. The optical path switch in the first stage 420 and two projectors in the second stage 440 form a first projector unit. The first projector unit has a first field of view. A separate optical path switch in the first stage 420 may also receive light from the optical path switch of the base stage 410. The separate optical path switch in the first stage 420 and two separate projectors in the second stage 440 form a second projector unit. The second projector unit has a second field of view. The first field of view and the second field of view are tiled to form an overall field of view that is larger than the first field of view or the second field of view.

Example Optical Path Switch

Figure 5:
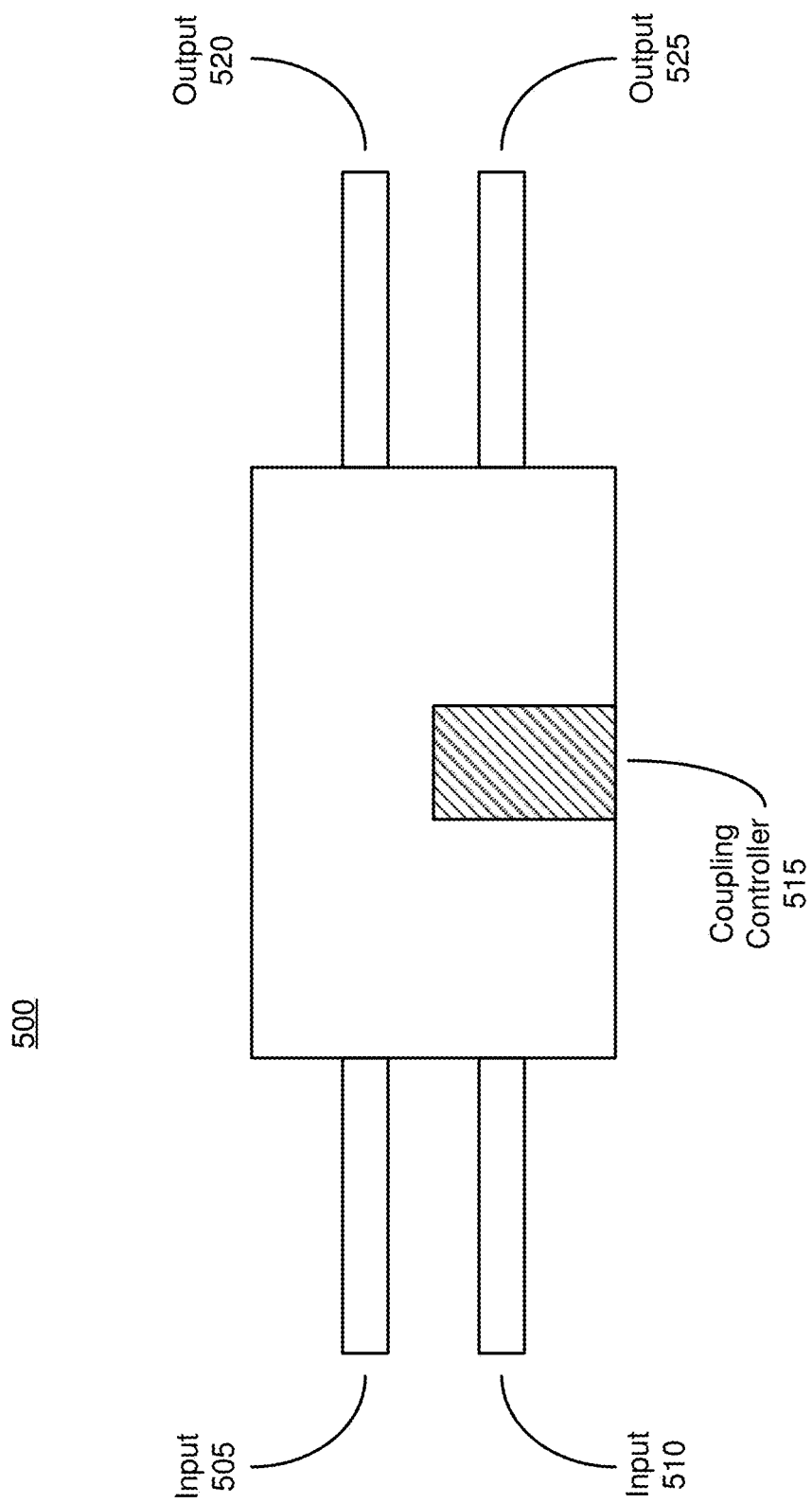
FIG. 5 is a diagram of a multimode interferometer (MMI), in accordance with one or more embodiments.

FIG. 5 is a diagram of a multimode interferometer (MMI) 500, in accordance with one or more embodiments. The MMI 500 is an embodiment of the optical path switch 310 in FIGS. 3A and 3B. The MMI 500 controls an amount of light that is provided to one or more projectors (e.g., the projectors 320 and 330) via a first output 520 and/or a second output 525 in accordance with instructions from a controller (e.g., the DCA controller 240). The illustrated MMI 500 includes a first input 505, a second input 510, a coupling controller 515, and the first output 520, and the second output 525.

The MMI 500 receives light (e.g., from a light source) via the first input 505 and the second input 510. In one embodiment, the same light source provides light to the first input 505 and the second input 510. In some embodiments, a different light source provides light to the first input 505 and the second input 510. In some embodiments, MMI 500 may include only one input (i.e., either the first input 505 or the second input 510).

The coupling controller 515 controls the amount of light provided to each output based on the instructions from the controller. In one embodiment, the MMI 500 may provide all of the light to the first output 520. In some embodiments, due to loss of light caused by absorption, reflections, etc., the MMI 500 may provide substantially all of the light to the first output 520. In both embodiments, the first output 520 outputs light to a projector (e.g., the first projector 320).

In some embodiments, the MMI 500 provides a greater amount of light to the first output 520 than the second output 525. In this embodiment, the first output 520 outputs a greater amount of light to the projector than the second output 525 outputs to a second projector (e.g., the second projector 330). In some embodiments, the MMI 500 alternates providing light to the first output 520 and the second output 525. In this embodiment, the first output 520 and the second output 525 alternate emitting light.

Method for Illuminating a Target Area

FIG. 6 is a flowchart illustrating a process 600 of illuminating a target area with light emitted by a switchable fringe pattern illuminator, in accordance with one or more embodiments. The process shown in FIG. 6 may be performed by components of a depth camera assembly (DCA) (e.g., the DCA 200). Other entities may perform some or all of the steps in FIG. 6 in other embodiments. Embodiments may include different and/or additional steps, or perform the steps in different orders.

The DCA generates 610 instructions for an illuminator (e.g., the illuminator 300 and the illuminator 302) and a camera assembly (e.g., the camera assembly 230). The instructions are generated and provided to the illuminator and the camera assembly by a DCA controller (e.g., the DCA controller 240). In some embodiments, the DCA controller may update the instructions prior to providing to the illuminator and the camera assembly based on determined depth information.

The DCA illuminates 620 a target area (e.g., via the illumination assembly) in accordance with the instructions. The instructions for the illuminator may include the selection of at least one projector from a plurality of projectors and/or the selection of a phase delay for the selected projector. In some embodiments, the instructions provided to the illuminator include the selection of at least one projector (e.g., the first projector 320 and the second projector 330). In one embodiment, the selection of at least one projector may consist activating one projector. In some embodiments, the selection of at least one projector may consist activating more than one projector. In one example, the projector is active at a specific time. In another example, the projector is active for a specific time period. In some embodiments, the instructions provided to the illuminator include selecting the phase delay for the selected projector. In one embodiment, the selection of the phase delay for the selected projector may consist providing a phase shift to a phase delay device (e.g., the first phase delay device 325 and the second phase delay device 335). In some embodiments, the selection of the phase delay for the selected projector may include providing a phase shift to one or more phase delay devices.

The DCA captures 630 images of a portion of the target area (e.g., via the camera assembly) in accordance with the instructions. The camera assembly of the DCA captures one or more images of at least a portion of the fringe pattern light reflected from one or more objects in the target area. The instructions for the camera assembly include when to capture images. For example, the camera assembly may be provided instructions to constantly capture images of a portion of the target area or to capture images during a specified time period. In another example, the camera assembly may be provided instructions to capture images when at least one projector is active.

The DCA determines 640 depth information (e.g., via the DCA controller) based in part on the captured images. The DCA controller of the DCA determines the depth information for one or more objects in the target area by comparing known interferometric pattern outputs by an illumination assembly to the detected deformed patterns that result from light reflected off of objects in the target area. In one embodiment, the DCA determines depth information after the camera assembly captures one image. In some embodiments, the DCA determines depth information after the camera assembly captures multiple images.

Artificial Reality System

Figure 7:
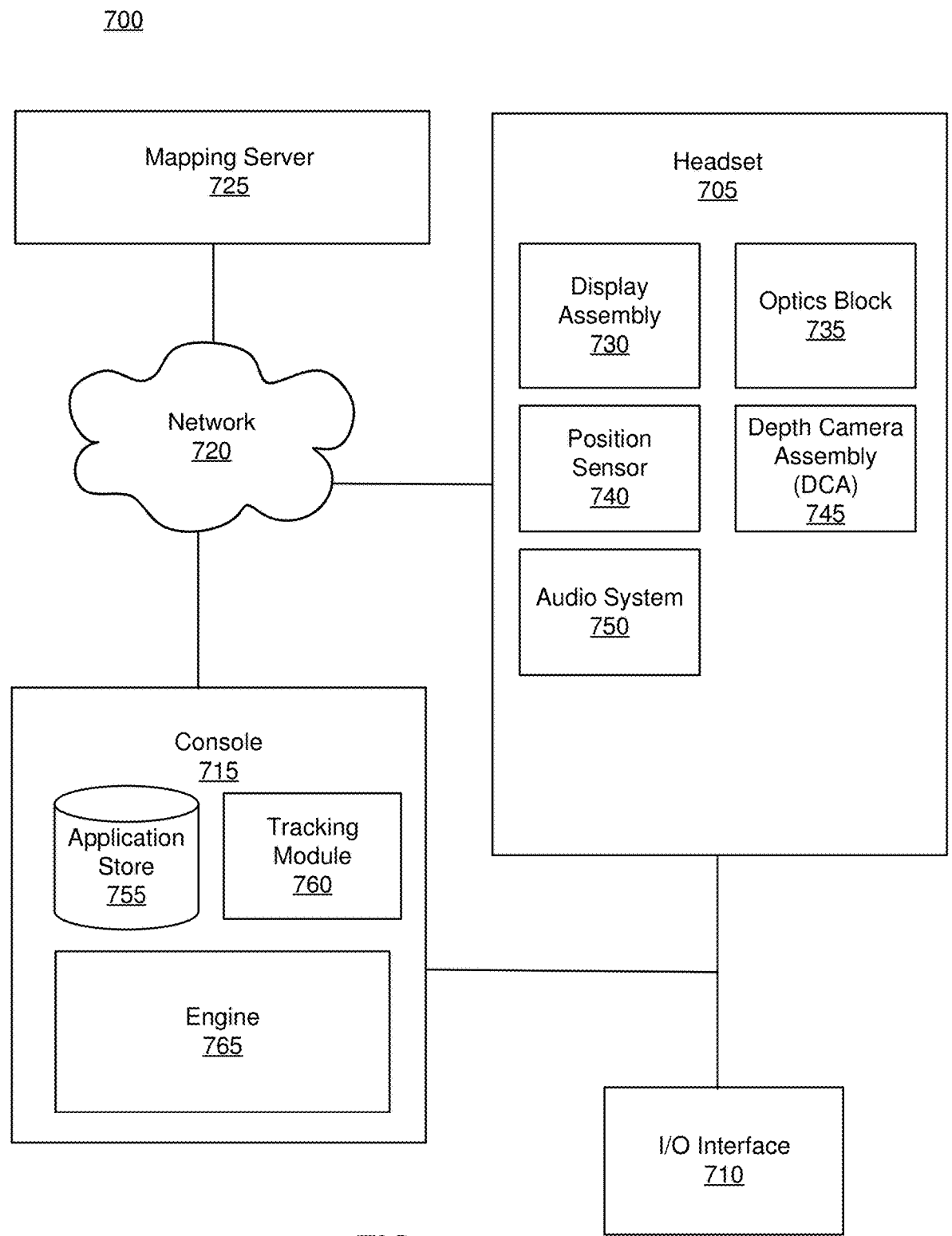
FIG. 7 is a system that includes a headset, in accordance with one or more embodiments.

FIG. 7 is a system 700 that includes a headset 705, in accordance with one or more embodiments. In some embodiments, the headset 705 may be the headset 100 of FIG. 1A or the headset 105 of FIG. 1B. The system 700 may operate in an artificial reality environment (e.g., a virtual reality environment, an augmented reality environment, a mixed reality environment, or some combination thereof). The system 700 shown by FIG. 7 includes the headset 705, an input/output (I/O) interface 710 that is coupled to a console 715, the network 720, and the mapping server 725. While FIG. 7 shows an example system 700 including one headset 705 and one I/O interface 710, in other embodiments any number of these components may be included in the system 700. For example, there may be multiple headsets each having an associated I/O interface 710, with each headset and I/O interface 710 communicating with the console 715. In alternative configurations, different and/or additional components may be included in the system 700. Additionally, functionality described in conjunction with one or more of the components shown in FIG. 7 may be distributed among the components in a different manner than described in conjunction with FIG. 7 in some embodiments. For example, some or all of the functionality of the console 715 may be provided by the headset 705.

The headset 705 includes the display assembly 730, an optics block 735, one or more position sensors 740, and the DCA 745. Some embodiments of headset 705 have different components than those described in conjunction with FIG. 7. Additionally, the functionality provided by various components described in conjunction with FIG. 7 may be differently distributed among the components of the headset 705 in other embodiments, or be captured in separate assemblies remote from the headset 705.

The display assembly 730 displays content to the user in accordance with data received from the console 715. The display assembly 730 displays the content using one or more display elements (e.g., the display elements 120). A display element may be, e.g., an electronic display. In various embodiments, the display assembly 730 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 735.

The optics block 735 may magnify image light received from the electronic display, corrects optical errors associated with the image light, and presents the corrected image light to one or both eye boxes of the headset 705. In various embodiments, the optics block 735 includes one or more optical elements. Example optical elements included in the optics block 735 include: an aperture, a Fresnel lens, a convex lens, a concave lens, a filter, a reflecting surface, or any other suitable optical element that affects image light. Moreover, the optics block 735 may include combinations of different optical elements. In some embodiments, one or more of the optical elements in the optics block 735 may have one or more coatings, such as partially reflective or anti-reflective coatings.

Magnification and focusing of the image light by the optics block 735 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases all, of the user's field of view. Additionally, in some embodiments, the amount of magnification may be adjusted by adding or removing optical elements.

In some embodiments, the optics block 735 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 735 corrects the distortion when it receives image light from the electronic display generated based on the content.

The position sensor 740 is an electronic device that generates data indicating a position of the headset 705. The position sensor 740 generates one or more measurement signals in response to motion of the headset 705. The position sensor 190 is an embodiment of the position sensor 740. Examples of a position sensor 740 include: one or more IMUS, one or more accelerometers, one or more gyroscopes, one or more magnetometers, another suitable type of sensor that detects motion, or some combination thereof. The position sensor 740 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 705 from the sampled data. For example, the IMU integrates the measurement signals received from the accelerometers over time to estimate a velocity vector and integrates the velocity vector over time to determine an estimated position of a reference point on the headset 705. The reference point is a point that may be used to describe the position of the headset 705. While the reference point may generally be defined as a point in space, however, in practice the reference point is defined as a point within the headset 705.

The DCA 745 generates depth information for a portion of the local area. The DCA 745 can compute the depth information using the data (e.g., based on a captured portion of a fringe pattern), or the DCA 745 can send this information to another device such as the console 715 that can determine the depth information using the data from the DCA 745. The DCA 745 is used to determine depth information about a target area. In some embodiments, the target area is an eye of a user, and thus the DCA 745 is used for eye tracking. In some embodiments, the target area is part of the local area, and thus the DCA 745 is used to capture depth information about an area around a user.

The DCA 745 includes an illumination source, one or more imaging devices, and a DCA controller. An embodiment of the DCA 745 is the DCA 200 of FIG. 2A. The illumination source of the DCA 745 is configured to illuminate the target area with light in accordance with instructions. The illumination source of the DCA 745 may be any of the illuminators described in FIGS. 3A-4. The imaging devices may include one or more cameras configured to capture one or more images of at least a portion of the target area. The controller of the DCA 745 generates the instructions and provides the instructions to the illuminator. The controller of the DCA 745 further determines depth information for the one or more objects in the target area based in part on the captured one or more images. In some embodiments, the DCA 745 may provide the determined depth information to the console 715 coupled to the headset 705 that generates content based on the depth information for presentation on a display of the headset 705.

In some embodiments, the DCA 745 is be used for eye tracking. The DCA 745 determines eye tracking information associated with the eye of the user wearing the headset 705. The eye tracking information determined by the DCA 745 may comprise information about an orientation of the eye of the user, i.e., information about an angle of an eye gaze.

Alternatively, the DCA 745 may be integrated into a console 715 external to the headset. In this case, the DCA 745 may be configured to sense various body parts of a user wearing the headset 705 or portions of an environment, e.g., for recording the geometry of a user or a local area, hand-tracking, eye-tracking, face recognition, gesture recognition, environment scanning, environment reconstruction, etc. In some embodiments, the DCA 745 may be integrated into a portable computing platform (e.g., a mobile phone or tablet).

The audio system 750 provides audio content to a user of the headset 705. The audio system 750 may comprise one or acoustic sensors, one or more transducers, and an audio controller. The audio system 750 may provide spatialized audio content to the user. In some embodiments, the audio system 750 may request acoustic parameters from the mapping server 725 over the network 720. The acoustic parameters describe one or more acoustic properties (e.g., room impulse response, a reverberation time, a reverberation level, etc.) of the local area. The audio system 750 may provide information describing at least a portion of the local area from e.g., the DCA 745 and/or location information for the headset 705 from the position sensor 740. The audio system 750 may generate one or more sound filters using one or more of the acoustic parameters received from the mapping server 725, and use the sound filters to provide audio content to the user.

The I/O interface 710 is a device that allows a user to send action requests and receive responses from the console 715. An action request is a request to perform a particular action. For example, an action request may be an instruction to start or end capture of image or video data, or an instruction to perform a particular action within an application. The I/O interface 710 may include one or more input devices. Example input devices include: a keyboard, a mouse, a game controller, or any other suitable device for receiving action requests and communicating the action requests to the console 715. An action request received by the I/O interface 710 is communicated to the console 715, which performs an action corresponding to the action request. In some embodiments, the I/O interface 710 includes an IMU that captures calibration data indicating an estimated position of the I/O interface 710 relative to an initial position of the I/O interface 710. In some embodiments, the I/O interface 710 may provide haptic feedback to the user in accordance with instructions received from the console 715. For example, haptic feedback is provided when an action request is received, or the console 715 communicates instructions to the I/O interface 710 causing the I/O interface 710 to generate haptic feedback when the console 715 performs an action.

The console 715 provides content to the headset 705 for processing in accordance with information received from one or more of: the DCA 745, the headset 705, and the I/O interface 710. In the example shown in FIG. 7, the console 715 includes an application store 755, a tracking module 760, and an engine 765. Some embodiments of the console 715 have different modules or components than those described in conjunction with FIG. 7. Similarly, the functions further described below may be distributed among components of the console 715 in a different manner than described in conjunction with FIG. 7. In some embodiments, the functionality discussed herein with respect to the console 715 may be implemented in the headset 705, or a remote system.

The application store 755 stores one or more applications for execution by the console 715. An application is a group of instructions, that when executed by a processor, generates content for presentation to the user. Content generated by an application may be in response to inputs received from the user via movement of the headset 705 or the I/O interface 710. Examples of applications include: gaming applications, conferencing applications, video playback applications, or other suitable applications.

The tracking module 760 tracks movements of the headset 705 or of the I/O interface 710 using information from the DCA 745, the one or more position sensors 740, or some combination thereof. For example, the tracking module 760 determines a position of a reference point of the headset 705 in a mapping of a local area based on information from the headset 705. The tracking module 760 may also determine positions of an object or virtual object. Additionally, in some embodiments, the tracking module 760 may use portions of data indicating a position of the headset 705 from the position sensor 740 as well as representations of the local area from the DCA 745 to predict a future location of the headset 705. The tracking module 760 provides the estimated or predicted future position of the headset 705 or the I/O interface 710 to the engine 765.

The engine 765 executes applications and receives position information, acceleration information, velocity information, predicted future positions, or some combination thereof, of the headset 705 from the tracking module 760. Based on the received information, the engine 765 determines content to provide to the headset 705 for presentation to the user. For example, if the received information indicates that the user has looked to the left, the engine 765 generates content for the headset 705 that mirrors the user's movement in a virtual local area or in a local area augmenting the local area with additional content. Additionally, the engine 765 performs an action within an application executing on the console 715 in response to an action request received from the I/O interface 710 and provides feedback to the user that the action was performed. The provided feedback may be visual or audible feedback via the headset 705 or haptic feedback via the I/O interface 710.

The network 720 couples the headset 705 and/or the console 715 to the mapping server 725. The network 720 may include any combination of local area and/or wide area networks using both wireless and/or wired communication systems. For example, the network 720 may include the Internet, as well as mobile telephone networks. In one embodiment, the network 720 uses standard communications technologies and/or protocols. Hence, the network 720 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 720 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 720 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 725 may include a database that stores a virtual model describing a plurality of spaces, wherein one location in the virtual model corresponds to a current configuration of a local area of the headset 705. The mapping server 725 receives, from the headset 705 via the network 720, information describing at least a portion of the local area and/or location information for the local area. The mapping server 725 determines, based on the received information and/or location information, a location in the virtual model that is associated with the local area of the headset 705. The mapping server 725 determines (e.g., retrieves) one or more acoustic parameters associated with the local area, based in part on the determined location in the virtual model and any acoustic parameters associated with the determined location. The mapping server 725 may transmit the location of the local area and any values of acoustic parameters associated with the local area to the headset 705.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A headset comprising:
   an illuminator configured to illuminate a target area within a local area surrounding the headset with light, the illuminator comprising an optical path switch configured to receive light and dynamically control an amount of light provided to a first projector and a second projector, the first projector configured to generate a first interference fringe pattern using light from the optical path switch, and the second projector configured to generate a second interference fringe pattern using light from the optical path switch, wherein the first interference fringe pattern illuminates a first portion of the target area and the second interference fringe pattern illuminates a second portion of the target area;
   one or more imaging devices configured to capture a plurality of images of the target area illuminated with light; and
   a controller configured to:
      determine depth information for the target area based in part on the plurality of images and a depth determination technique, and
      generate, based in part on the determined depth information, instructions for the illuminator to adjust illumination of the target area.

2. The headset of claim 1, wherein the illuminator further comprises a light source, and wherein the optical path switch receives light from the light source.

3. The headset of claim 1, wherein the optical path switch, the first projector, and the second projector form a first projector unit of the illuminator, the first projector unit having a first field of view, and wherein the illuminator further comprises a second projector unit having a second field of view and a separate optical path switch configured to dynamically control an amount of light provided to the optical path switch and an amount of light provided to the second projector unit, and wherein the first field of view and the second field of view are tiled to form a field of view that is larger than the first field of view and the second field of view.

4. The headset of claim 1, wherein substantially all of the light received by the optical path switch is provided to the first projector.

5. The headset of claim 1, wherein the amount of light provided to the first projector is equal to the amount of light provided to the second projector.

6. The headset of claim 1, wherein the optical path switch comprises two waveguides with one of the waveguides configured to provide light to the first projector and another of the waveguides configured to provide light to the second projector.

7. The headset of claim 1, wherein the first projector comprises:
   a first waveguide;
   a second waveguide, and an entrance of the second waveguide is coupled to an entrance of the first waveguide such that light from the optical path switch is split between the first waveguide and the second waveguide; and
   a first phase delay device that is coupled to the second waveguide, the first phase delay device configured to introduce a phase shift in light propagating through the second waveguide relative to light in the first waveguide such that light exiting the first waveguide and light exiting the second waveguide combine to form the first interference fringe pattern.

8. The headset of claim 7, wherein the first phase delay device is configured to dynamically adjust the phase shift.

9. The headset of claim 7, wherein the second projector comprises:
   a third waveguide;
   a fourth waveguide, and an entrance of the fourth waveguide is coupled to an entrance of the third waveguide such that light from the optical path switch is split between the third waveguide and the fourth waveguide; and
   a second phase delay device that is coupled to the fourth waveguide, the second phase delay device configured to introduce a phase shift in light propagating through the fourth waveguide relative to light in the third waveguide such that light exiting the third waveguide and light exiting the fourth waveguide combine to form the second interference fringe pattern.

10. The headset of claim 9, wherein the second phase delay device is configured to dynamically adjust the phase shift.

11. The headset of claim 1, wherein the first interference fringe pattern has a first fringe spacing and the second interference fringe pattern has a second fringe spacing that is the same as the first fringe spacing.

12. The headset of claim 1, wherein the first interference fringe pattern has a first fringe spacing and the second interference fringe pattern has a second fringe spacing that is different from the first fringe spacing.

13. The headset of claim 1, wherein the first projector has a first field of view and the second projector has a second field of view that does not overlap with the first field of view.

14. The headset of claim 1, wherein the first portion of the target area overlaps the second portion of the target area.

15. The headset of claim 1, wherein the optical path switch, the first projector, and the second projector are located on a single substrate.

16. The headset of claim 1, wherein the optical path switch is a Mach-Zehnder interferometer (MZI), a multimode interferometer (MMI)-based switch, or a ring-resonator-based switch.

17. A method comprising:
  illuminating, by an illuminator of a headset, a target area within a local area based on a set of instructions, wherein the set of instructions dynamically controls an amount of light an optical path switch of the illuminator provides to a first projector of the illuminator and to a second projector of the illuminator, wherein the first projector generates a first interference fringe pattern using light from the optical path switch, and the second projector generates a second interference fringe pattern using light from the optical path switch, and wherein the first interference fringe pattern illuminates a first portion of the target area and the second interference fringe pattern illuminates a second portion of the target area;
  capturing, by one or more imaging devices of the headset, a plurality of images of the illuminated target area; and
  determining, by the headset, depth information for the target area based in part on the plurality of images and a depth determination technique.

18. The method of claim 17, further comprising:
  based on the determined depth information, generating an updated set of instructions to provide to the illuminator to dynamically adjust illumination of the target area.

19. The method of claim 17, wherein the first projector includes a first waveguide and a second waveguide, and an entrance of the second waveguide is coupled to an entrance of the first waveguide such that light from the optical path switch is split between the first waveguide and the second waveguide, and wherein the set of instructions dynamically adjusts a phase shift in light propagating through the second waveguide of the first projector.

20. A non-transitory computer-readable storage medium storing instructions that, when executed by one or more processors, cause a headset to perform operations comprising:
  illuminating, by an illuminator of the headset, a target area within a local area based on a set of instructions, wherein the set of instructions dynamically controls an amount of light an optical path switch of the illuminator provides to a first projector of the illuminator and to a second projector of the illuminator, wherein the first projector generates a first interference fringe pattern using light from the optical path switch, and the second projector generates a second interference fringe pattern using light from the optical path switch, and wherein the first interference fringe pattern illuminates a first portion of the target area and the second interference fringe pattern illuminates a second portion of the target area;
  capturing, by one or more imaging devices of the headset, a plurality of images of the illuminated target area; and
  determining depth information for the target area based in part on the plurality of images and a depth determination technique.

* * * * *